US012562798B2

(12) United States Patent
Xiao et al.

(10) Patent No.: US 12,562,798 B2
(45) Date of Patent: Feb. 24, 2026

(54) NETWORK PARAMETER SET INFORMATION TRANSMISSION METHOD AND APPARATUS, TERMINAL, BASE STATION, AND MEDIUM

(71) Applicant: ZTE CORPORATION, Shenzhen (CN)

(72) Inventors: Huahua Xiao, Shenzhen (CN); Zhaohua Lu, Shenzhen (CN); Hao Wu, Shenzhen (CN); Lun Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 296 days.

(21) Appl. No.: 18/551,057

(22) PCT Filed: Dec. 14, 2021

(86) PCT No.: PCT/CN2021/137847
§ 371 (c)(1),
(2) Date: Sep. 18, 2023

(87) PCT Pub. No.: WO2022/199142
PCT Pub. Date: Sep. 29, 2022

(65) Prior Publication Data
US 2024/0162959 A1    May 16, 2024

(30) Foreign Application Priority Data

Mar. 25, 2021    (CN) .......................... 202110322349.7

(51) Int. Cl.
*H04B 7/06*        (2006.01)
*H04B 17/391*      (2015.01)
(Continued)

(52) U.S. Cl.
CPC ....... *H04B 7/0626* (2013.01); *H04B 17/3913* (2015.01); *H04W 72/21* (2023.01); *H04W 80/02* (2013.01)

(58) Field of Classification Search
None
See application file for complete search history.

(56) References Cited

U.S. PATENT DOCUMENTS

2020/0367051 A1    11/2020   Wang et al.
2021/0049451 A1    2/2021    Wang et al.
(Continued)

FOREIGN PATENT DOCUMENTS

CN        111954206 A      11/2020
CN        112152948 A      12/2020
(Continued)

OTHER PUBLICATIONS

International Searching Authority. International Search Report and Written Opinion for PCT Application No. PCT/CN2021/137847 and English translation, mailed Feb. 29, 2022, pp. 1-10.
(Continued)

*Primary Examiner* — Minh Trang T Nguyen
(74) *Attorney, Agent, or Firm* — Vivacqua Crane, PLLC

(57) ABSTRACT

A network parameter set information transmission method and apparatus, a terminal, a base station, and a storage medium are disclosed. The method may include, acquiring at least one set of neural network parameters; selecting at least one set of neural network parameters from the at least one set of neural network parameters according to a channel feature; and transmitting information of the set of network parameters corresponding to the selected set of neural network parameters.

19 Claims, 6 Drawing Sheets

(51) Int. Cl.
H04W 72/21 (2023.01)
H04W 80/02 (2009.01)

(56) References Cited

U.S. PATENT DOCUMENTS

| | | | |
|---|---|---|---|
| 2021/0064996 A1 | 3/2021 | Wang et al. | |
| 2021/0375294 A1* | 12/2021 | Gu ........................ | G10L 19/008 |
| 2022/0092357 A1* | 3/2022 | Takada .................. | G06F 18/214 |

FOREIGN PATENT DOCUMENTS

| | | |
|---|---|---|
| WO | 2020180221 A1 | 9/2020 |
| WO | 2020213964 A1 | 10/2020 |

OTHER PUBLICATIONS

European Patent Office. Extended European Search Report for EP Application No. 21932749.1, mailed Feb. 24, 2025, pp. 1-10.

* cited by examiner

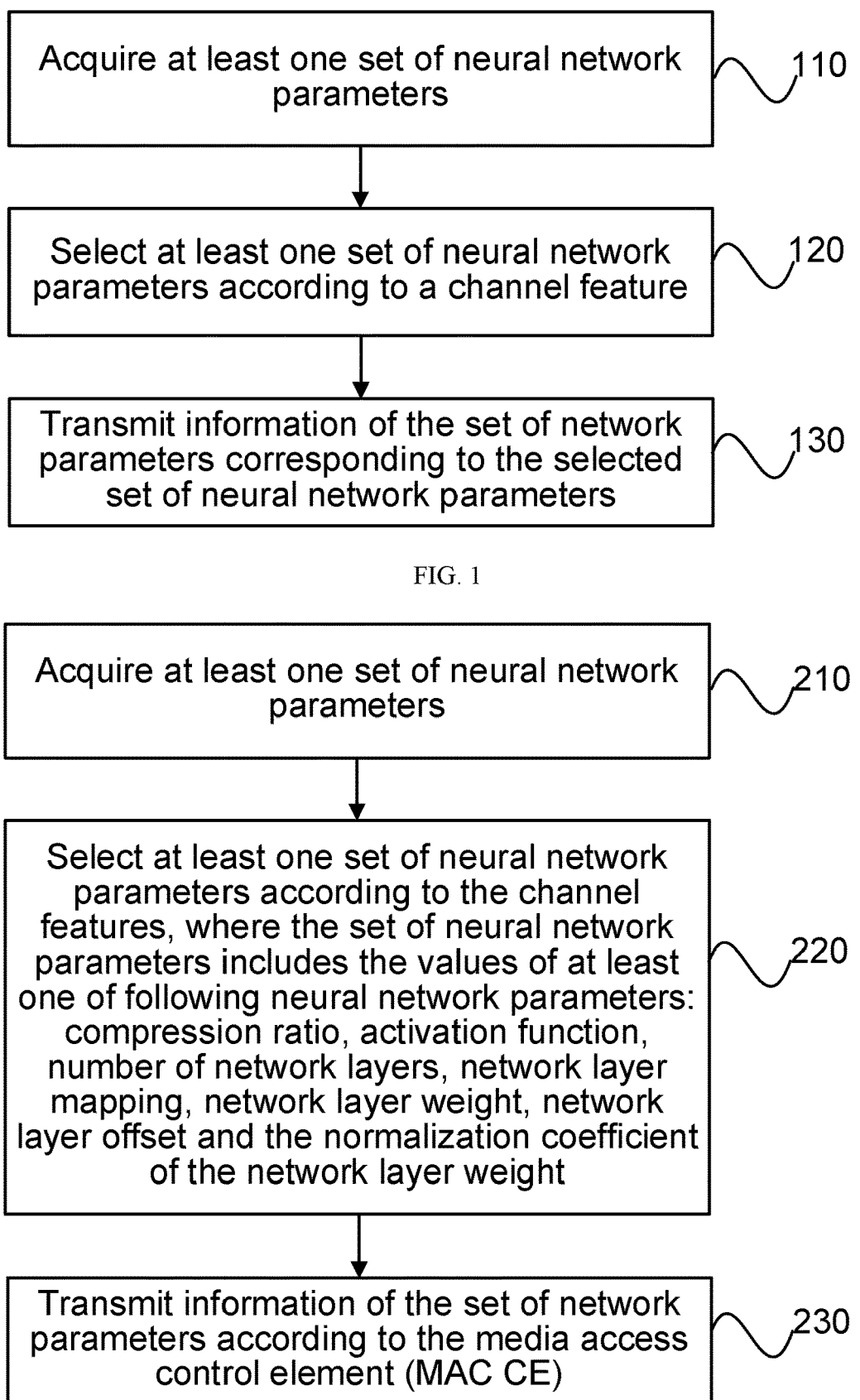

Acquire at least one set of neural network parameters 〜110

Select at least one set of neural network parameters according to a channel feature 〜120

Transmit information of the set of network parameters corresponding to the selected set of neural network parameters 〜130

FIG. 1

Acquire at least one set of neural network parameters 〜210

Select at least one set of neural network parameters according to the channel features, where the set of neural network parameters includes the values of at least one of following neural network parameters: compression ratio, activation function, number of network layers, network layer mapping, network layer weight, network layer offset and the normalization coefficient of the network layer weight 〜220

Transmit information of the set of network parameters according to the media access control element (MAC CE) 〜230

FIG. 2

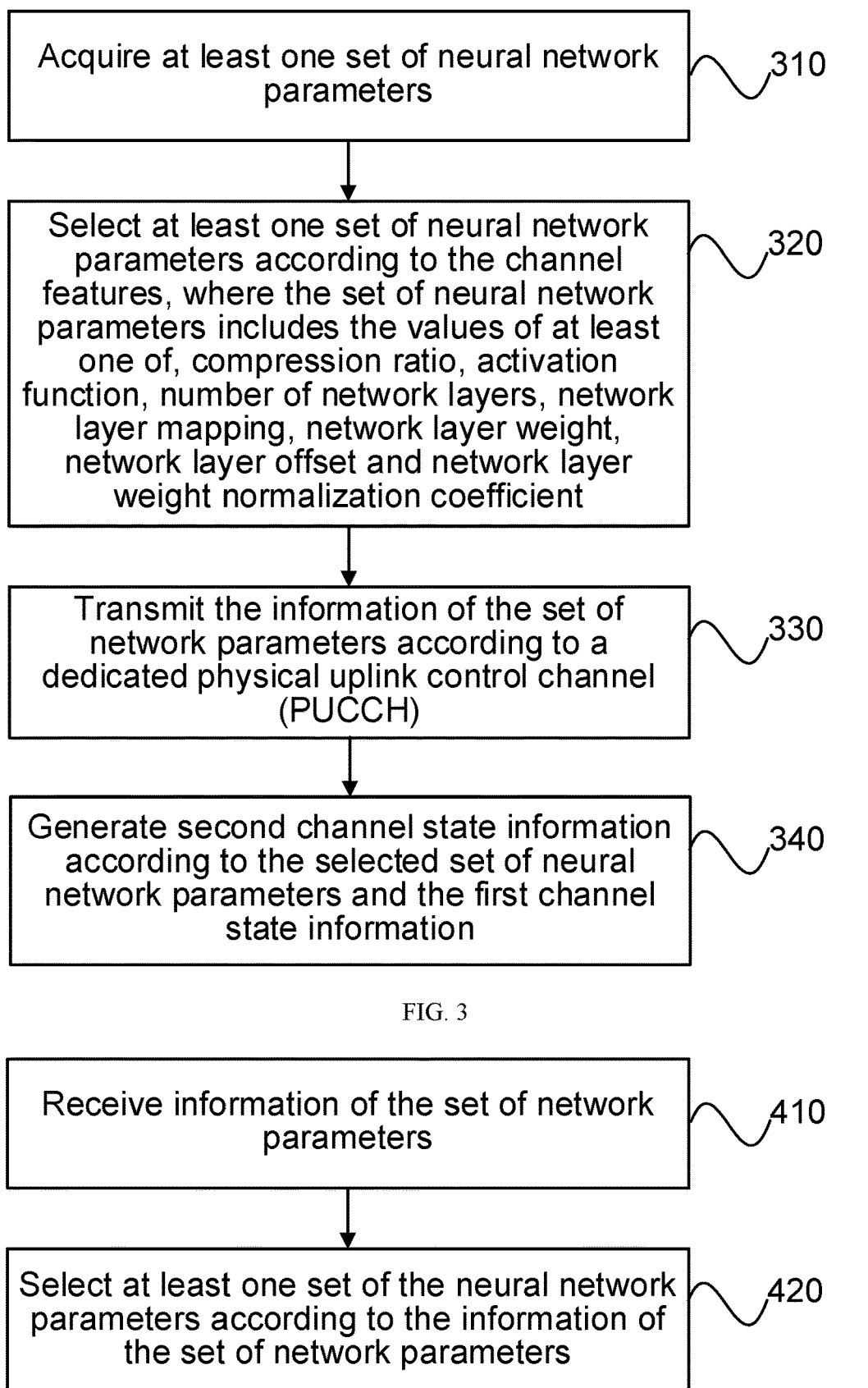

Acquire at least one set of neural network parameters ∿⟋310

Select at least one set of neural network parameters according to the channel features, where the set of neural network parameters includes the values of at least one of, compression ratio, activation function, number of network layers, network layer mapping, network layer weight, network layer offset and network layer weight normalization coefficient ∿⟋320

Transmit the information of the set of network parameters according to a dedicated physical uplink control channel (PUCCH) ∿⟋330

Generate second channel state information according to the selected set of neural network parameters and the first channel state information ∿⟋340

FIG. 3

Receive information of the set of network parameters ∿⟋410

Select at least one set of the neural network parameters according to the information of the set of network parameters ∿⟋420

FIG. 4

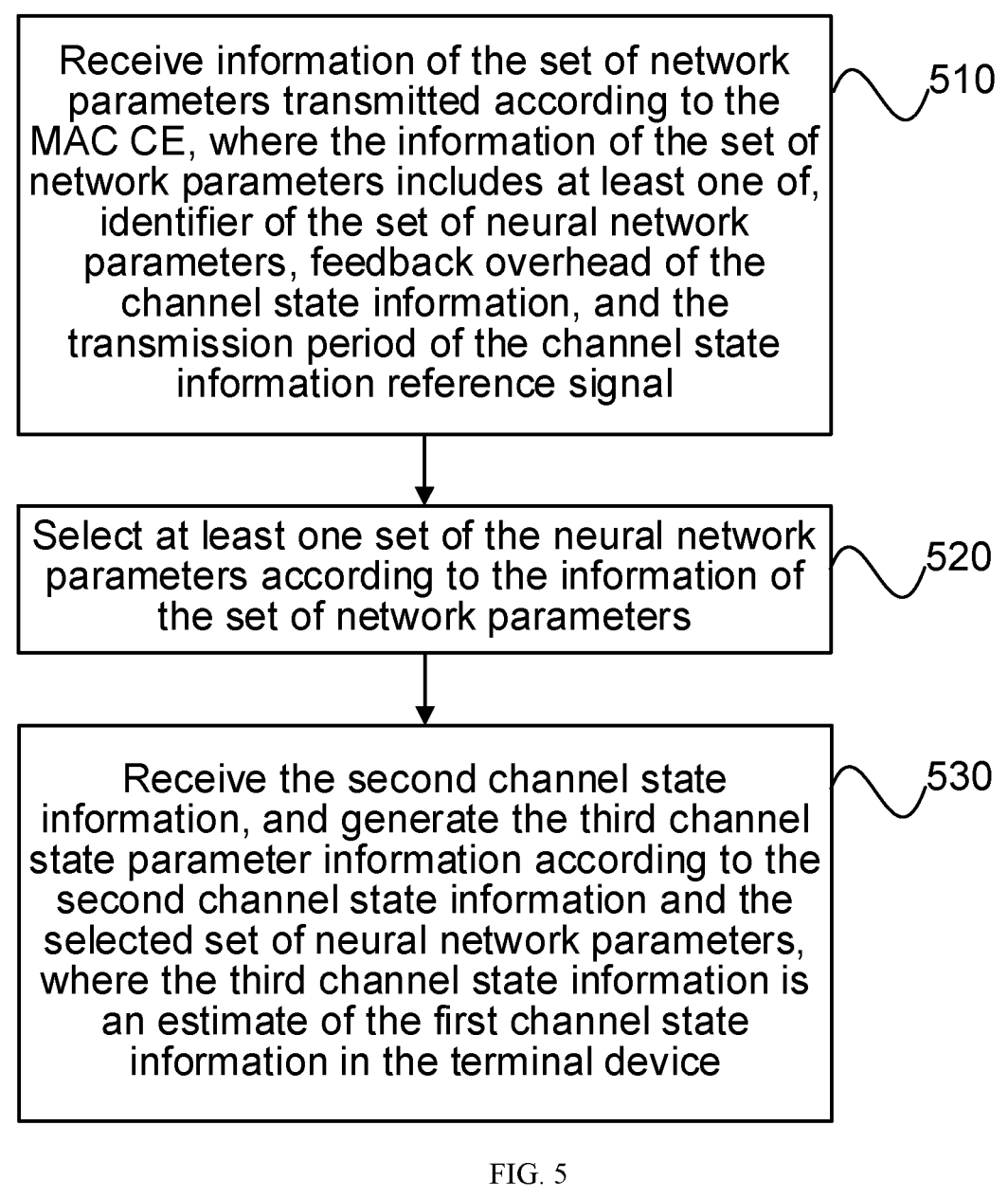

Receive information of the set of network parameters transmitted according to the MAC CE, where the information of the set of network parameters includes at least one of, identifier of the set of neural network parameters, feedback overhead of the channel state information, and the transmission period of the channel state information reference signal $\sim$ 510

Select at least one set of the neural network parameters according to the information of the set of network parameters $\sim$ 520

Receive the second channel state information, and generate the third channel state parameter information according to the second channel state information and the selected set of neural network parameters, where the third channel state information is an estimate of the first channel state information in the terminal device $\sim$ 530

FIG. 5

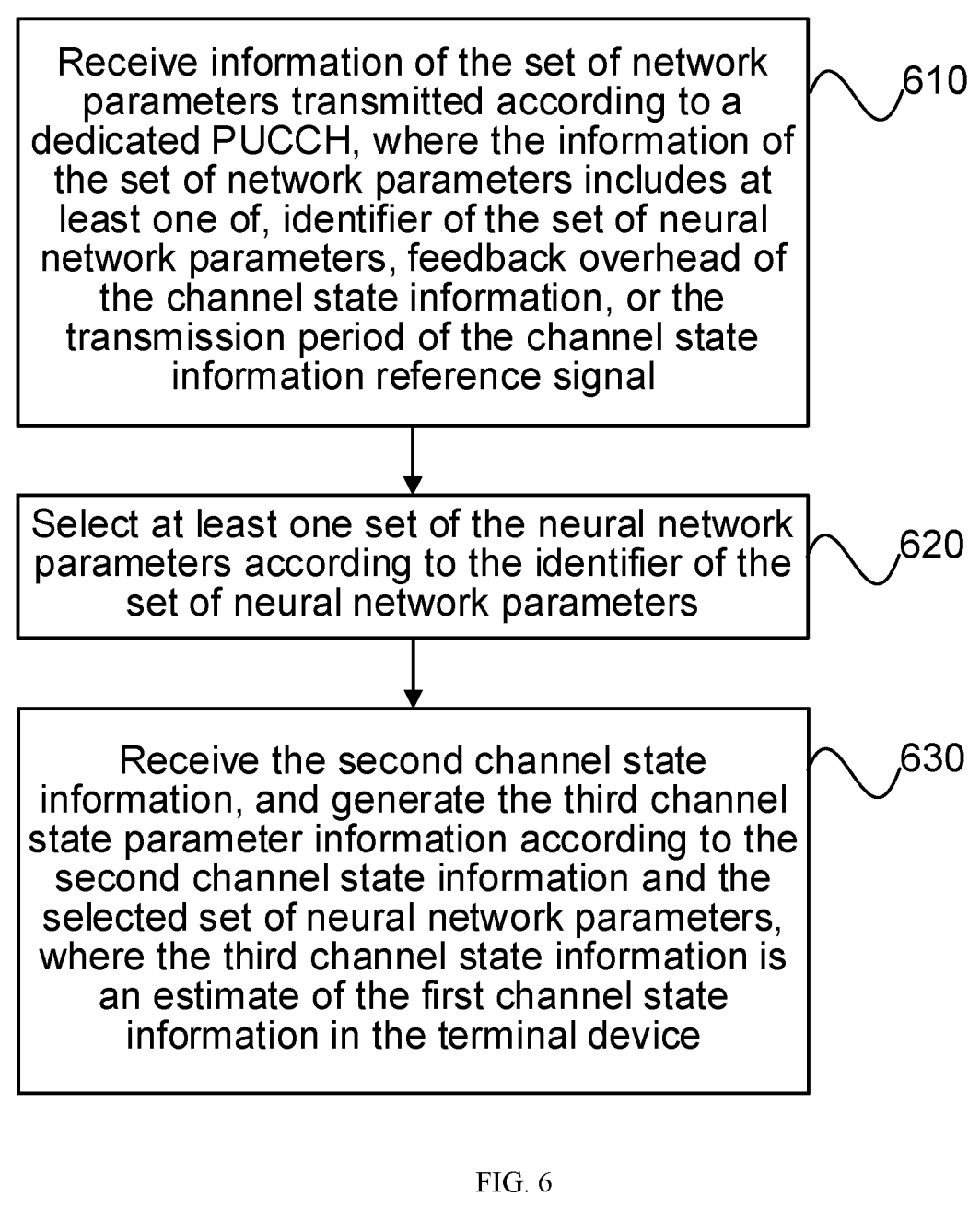

Receive information of the set of network parameters transmitted according to a dedicated PUCCH, where the information of the set of network parameters includes at least one of, identifier of the set of neural network parameters, feedback overhead of the channel state information, or the transmission period of the channel state information reference signal ⟶ 610

Select at least one set of the neural network parameters according to the identifier of the set of neural network parameters ⟶ 620

Receive the second channel state information, and generate the third channel state parameter information according to the second channel state information and the selected set of neural network parameters, where the third channel state information is an estimate of the first channel state information in the terminal device ⟶ 630

FIG. 6

NETWORK PARAMETER SET INFORMATION TRANSMISSION METHOD AND APPARATUS, TERMINAL, BASE STATION, AND MEDIUM

CROSS-REFERENCE TO RELATED APPLICATION

This application is a national stage filing under 35 U.S.C. § 371 of international application number PCT/CN2021/137847, filed Dec. 14, 2021, which claims priority to Chinese patent application No. 202110322349.7 filed Mar. 25, 2021. The contents of these applications are incorporated herein by reference in their entirety.

TECHNICAL FIELD

The present disclosure relates to the technical field of wireless communication, and in particular to a method and an apparatus for transmitting information of a set of network parameters, a terminal device, a base station, and a medium.

BACKGROUND

Multi-antenna technique is one of the important means to improve the quality of wireless communication currently, and which plays an important role in standards such as Long Term Evolution (LTE), Long Term Evolution-Advanced (LTE-A), and New Radio (NR) access technology. In order to make full use of multi-antenna technique, it is often necessary for base stations or terminal devices to obtain accurate channel state information (CSI). Artificial Intelligence (AI) is one of the most important and promising techniques, which has strong feature extraction and classification ability, and has been widely used in all walks of life. Since the channel state information has to be obtained accurately, and the powerful performance of AI provides the possibility for obtaining the channel state information. And thus, how to apply the AI technique into the communication of multi-antenna technique and realize the accurate feedback of the channel state information will have important application prospects. However, it is still some unsolved issues in applying AI to CSI feedback in the existing technology.

SUMMARY

Provided are a method and an apparatus for transmitting information of a set of network parameters, a terminal device, a base station, and a storage medium in some embodiments of the present disclosure, which are intended to carry out a method for transmitting network parameters for enhancing the feedback of channel state information in the multi-antenna technique. By the transmitted updated network parameters, the current channel features can be better matched, so that the updated neural network can be better employed to generate channel state information and improve the quality of wireless communication.

An embodiment of the present disclosure provides a method for transmitting information of a set of network parameters, which may include, acquiring at least one set of neural network parameters; selecting at least one set of the neural network parameters according to a channel feature; and transmitting information of a set of network parameters corresponding to the selected set of neural network parameters.

An embodiment of the present disclosure provides a method for transmitting information of a set of network parameters, which may include, receiving information of a set of network parameters; and selecting at least one set of the neural network parameters according to the information of the set of network parameters.

An embodiment of the present disclosure provides an apparatus for transmitting information of a set of network parameters, which may include, a neural network parameter module, which is configured to acquire at least one set of neural network parameters; a parameter set selection module, which is configured to select at least one set of the neural network parameters according to a channel feature; and a network information transmission module, which is configured to transmit the information of the set of network parameters corresponding to the selected set of neural network parameters.

An embodiment of the present disclosure provides an apparatus for transmitting information of a set of network parameters, which may include, a network information receiving module, which is configured to receive information of a set of network parameters; and a network set selection module is configured to select at least one set of the neural network parameters according to the information of the set of network parameters.

An embodiment of the present disclosure provides a terminal device, which may include at least one processor and a memory configured to store at least one program which, when executed by the at least one processor, causes the at least one processor to carry out any one of the methods as described above.

An embodiment of the present disclosure provides a base station, which may include at least one processor and a memory configured to store at least one program which, when executed by the at least one processor, causes the at least one processor to carry out any one of the methods as described above.

An embodiment of the present disclosure provides a computer-readable storage medium storing at least one computer program, which when executed by a processor, causes the processor to carry out any one of the methods as described above.

BRIEF DESCRIPTION OF DRAWINGS

FIG. 1 depicts a flowchart showing a method for transmitting information of a set of network parameters according to an embodiment of the present disclosure;

FIG. 2 depicts a flowchart of a method for transmitting information of a set of network parameters according to another embodiment of the present disclosure;

FIG. 3 depicts a flowchart of a method for transmitting information of a set of network parameters according to another embodiment of the present disclosure;

FIG. 4 depicts a flowchart showing a method for transmitting information of a set of network parameters according to an embodiment of the present disclosure;

FIG. 5 depicts a flowchart of a method for transmitting information of a set of network parameters according to another embodiment of the present disclosure;

FIG. 6 depicts a flowchart of a method for transmitting information of a set of network parameters according to another embodiment of the present disclosure;

DETAILED DESCRIPTION

Figures 7, 8, 9:
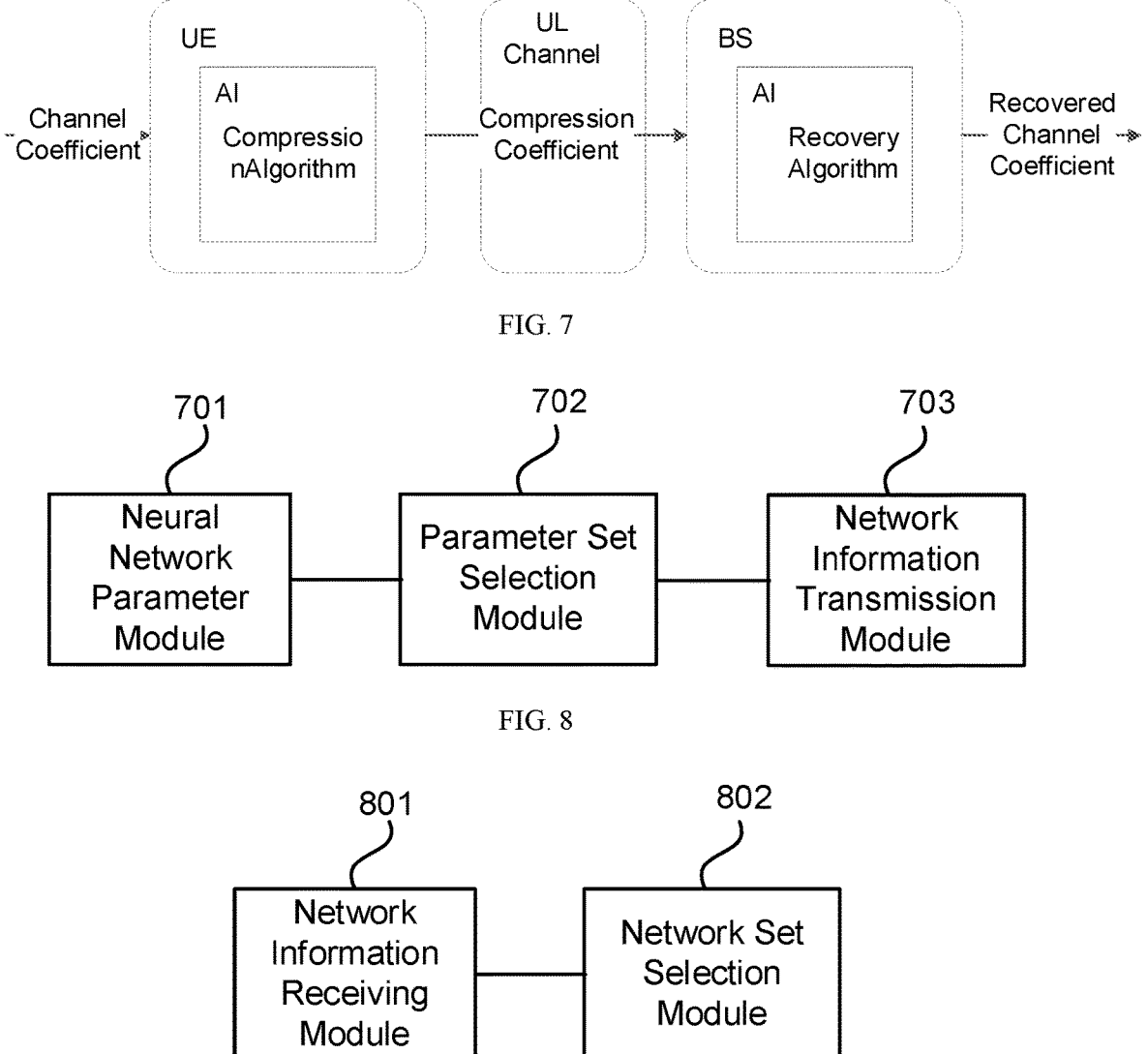
FIG. 7 depicts an example diagram showing the transmission of the channel state information according to an embodiment of the present disclosure.
FIG. 8 depicts a schematic diagram showing an apparatus for transmitting information of a set of network parameters according to an embodiment of the present disclosure.
FIG. 9 depicts a schematic diagram showing an apparatus for transmitting information of a set of network parameters according to an embodiment of the present disclosure.

It should be understood that the embodiments described here are illustrative but not limiting.

In the following description, the use of suffixes such as "module", "component" or "unit" to represent elements is only for the convenience of the description of the present disclosure, and they do not necessarily have a specific meaning. Therefore, "modules", "components" or "units" can be used in combination.

FIG. 1 depicts a flowchart showing a method for transmitting information of a set of network parameters according to an embodiment of the present disclosure, which can be applied to improve the wireless communication quality. The method can be performed by an apparatus for transmitting information of a set of network parameters in an embodiment of the present disclosure. The apparatus can be implemented as software and/or hardware and can be typically integrated into a terminal device. Referring to FIG. 1, the method includes the following operations.

At operation 110, at least one set of neural network parameters is acquired.

The set of neural network parameters can be a set of parameters for constructing a neural network model, which can include one or more parameters. The constructed neural network model can be employed to compress channel state information, reduce the resource consumption of channel state information transmission, or reduce the overhead for feedback of the channel state information.

In an embodiment of the present disclosure, one or more sets of neural network parameters may be acquired. The set of neural network parameters can be acquired from local pre-stored information, or from transmitted information. The parameters can be generated from information indicated by high-level signaling, or configured by high-level signaling.

At operation 120, at least one set of neural network parameters is selected according to a channel feature.

The channel feature can be the characteristics of electromagnetic wave propagation channels of various frequency bands or wavelengths provided by free space, such as attenuation, multipath effect and time-varying feature, and the channel features can be determined by measurement, detection or estimation.

According to the channel features, one or more sets of neural network parameters can be selected from the received sets of neural network parameters to generate channel state information.

At 130, information of a set of network parameters corresponding to the selected set of neural network parameters is transmitted.

The information of the set of network parameters can be a set of information indicating the construction of a neural network. And the information of the set of network parameters can indicate the attribute information of the set of neural network parameters, such as the compression ratio of the channel state information, or the overhead of the channel state information, or an index or an identifier of the set of neural network parameters which is indicative of one or more sets of selected neural network parameters.

In an embodiment of the present disclosure, a terminal device can determine the channel state information and construct the network parameters of the neural network model according to the selected set(s) of neural network parameters. For example, the terminal device can construct the neural network model according to the selected set of neural network parameters, compress the channel state information by means of the neural network model, and generate and send the information of the set of network parameters corresponding to the set of neural network parameters.

According to various embodiments of the present disclosure, by acquiring at least one set of neural network parameters, selecting the set of neural network parameters according to the channel features, and transmitting the information of the set of network parameters corresponding to the selected set of neural network parameters, the neural network parameters are more in line with the current channel features, so that the neural network established with the new neural network parameters can be further utilized to generate channel state information. Thereby, the communication channel quality can be improved, and the communication resource consumption for the transmission of the channel state information can be reduced.

In an embodiment, the information of the set of network parameters includes at least one of, identifier of the set of neural network parameters, feedback overhead of the channel state information, or a period for transmitting the channel state information reference signal (CSI-RS).

The identifier of the set of neural network parameters identifies the configured N sets of neural network parameters, which is the index of the set of neural network parameters. During the period from the time when the terminal device transmits the information of the set of network parameters to the time when the base station decides to employ the new set of neural network parameters, traditional codebooks can be employed to transmit the channel state information instead of the AI algorithm to compress the channel state information. Traditional codebooks include but are not limited to, codebooks constructed based on channel feature vectors and codewords constructed based on discrete Fourier vectors, such as codewords in LTE and NR.

In an embodiment of the present disclosure, the information of the set of network parameters may further include a parameter that is indicative of the feedback content of channel state information. In particular, the information may include the identifier of the set of network parameters and feedback overhead of the channel state information. The feedback overhead of the channel state information includes but is not limited to compression ratio, quantization bit of each feedback element, number of elements fed back, codebook type indication and traditional codebook indication. The codebook types include AI-based codebook and traditional codebook, and a period for transmitting the channel state information reference signal.

FIG. 2 depicts a flowchart showing a method for transmitting information of a set of network parameters according to another embodiment of the present disclosure, which embodies the embodiment described above. Referring to FIG. 2, the method includes the following operations.

At operation 210, at least one set of neural network parameters is acquired.

At 220, at least one set of neural network parameters is selected according to the channel features, where the set of neural network parameters includes the values of at least one of the following neural network parameters: compression ratio, activation function, number of network layers, network layer mapping, network layer weight, network layer offset, or the normalization coefficient of the network layer weight.

The compression ratio can be the ratio of the number of elements of the second channel state information to the number of elements of the first channel state information. The activation function can be the activation function employed by the activation layer in the neural network. The number of network layers can be the number of network layers included in the neural network model, such as the number of input layers, the number of output layers and the number of activation layers. The network layer mapping can be the mapping relationship between different network layers in the neural network model, such as the mapping of convolutional neural networks, the mapping of recurrent neural networks, and the mapping of fully connected networks. The network layer weights can be weights employed by different network layers. The normalization coefficient of network layer weights can be a parameter that rescales the values of the network layer weights to fall within the range of [a,b], where a and b are real numbers, for example, the values can be within the range of [0,1] or [−1,1].

At operation 230, information of the set of network parameters is transmitted according to the media access control element (MAC CE).

Upon receiving the MAC CE, the identifier of the set of the neural network parameters can be changed to inform the base station to update the neural network parameters, and decode the second channel state information with new neural network parameters to generate the third channel state information. During the time after the terminal device sends the MAC CE and before the base station decides to employ the new neural network, the traditional codebook is employed to feed back the channel state information, or the base station is informed by the codebook type indication that the traditional codebook is being employed.

According to various embodiments of the present disclosure, at least one set of neural network parameters is obtained, a set of neural network parameters is selected according to the channel features, and channel state information is generated based on the selected set of neural network parameters. The channel state information includes one or both of the first channel state information and the second channel state information. The identifier of the set of neural network parameters is triggered to be updated by means of the MAC CE. The set of neural network parameters is selected according to the channel features. The accuracy of acquisition of the channel state information is improved and the communication quality of wireless communication is enhanced by means of the set of neural network parameters to determine channel state information. Furthermore, the content feedback of channel state information can be switched by default or by means of codebook type indication, so as to achieve compatibility with existing wireless communication networks and enhance the robustness of wireless communication systems.

FIG. 3 depicts a flowchart showing a method for transmitting information of a set of network parameters according to another embodiment of the present disclosure, which embodies the embodiment described above. Referring to FIG. 3, the method includes the following operations.

At operation 310, at least one set of neural network parameters is acquired.

At operation 320, at least one set of neural network parameters is selected according to the channel features, where the set of neural network parameters includes the values of at least one of, compression ratios, activation function, number of network layers, network layer mapping, network layer weight, network layer offset, or network layer weight normalization coefficient.

At operation 330, the information of the set of network parameters is transmitted according to a dedicated physical uplink control channel (PUCCH).

When the scheduling request of the dedicated PUCCH is received, the identifier of the set of neural network parameters is changed to inform the base station to update the neural network parameters, and decode the second channel state information with the new neural network parameters to generate the third channel state information. During the time after the terminal device sends the MAC CE and before the base station decides to employ the new neural network, the traditional codebook is employed to feed back the channel state information, or the base station is informed by the codebook type indication that the traditional codebook is being employed.

At operation 340, the second channel state information is generated according to the selected set of neural network parameters and the first channel state information.

The first channel state information is the channel state information that is not subjected to compression based on an AI neural network, and the second channel state information is the channel state information that is subjected to compression based on the AI neural network.

In the embodiment of the present disclosure, the channel state information may include channel state information determined by an AI algorithm and channel state information determined by non-AI algorithm. A neural network model may be constructed by a selected set of neural network parameters. And the first channel state information may be input into the neural network model to determine the second channel state information. In an example, the corresponding AI-based codebook and/or traditional codebook can be generated according to the codebook type indication in the information of the set of network parameters. When the codebook type indication is 0, the traditional codebook is generated; when the codebook type indication is 1, the AI-based codebook is generated; and when the codebook type indication is 2, both the AI-based codebook and the traditional codebook are generated.

According to various embodiments of the present disclosure, at least one set of neural network parameters is obtained, and a set of neural network parameters is selected according to channel features. Information of the set of network parameters corresponding to the selected set of neural network parameters is transmitted. The second channel state information is determined based on the set of neural network parameters and the first channel state information. The scheduling request of a dedicated PUCCH is employed to trigger the update of the identifier of the set of neural network parameters. The set of neural network parameters is selected according to the channel features. The accuracy of acquisition of the channel state information acquisition is improved and the communication quality of wireless communication is enhanced, by determining the second channel state information with the set of neural network parameters and the first channel state information.

In an embodiment, the method further includes configuring at least one set of neural network parameters.

In an embodiment, the method further includes obtaining a traditional codebook according to channel features and feeding back the traditional codebook before determining to employ the selected set of neural network parameters.

In an embodiment of the present disclosure, when the acquired set of neural network parameters mismatches with the current channel, a traditional codebook can be generated in an existing method and fed back. As such, during the time after the terminal device sends the MAC CE and before the base station decides to employ the new neural network, the traditional codebook is employed to feed back the channel state information, or the base station is informed by the codebook type indication that the traditional codebook is employed.

In an embodiment, the method further includes obtaining and feeding back the updated neural network parameters.

In an embodiment of the present disclosure, the neural network parameters can also be updated, the neural network parameters transmitted by high-level signaling can be obtained, and the neural network parameters can also be transmitted to the base station or another terminal device.

In an embodiment, a parameter of the CSI is acquired. The obtained parameter of the CSI is employed to determine the first channel state information, and the parameter of the CSI includes at least one of, the channel base vectors, channel base vector number, maximum number of ports, channel type indicator, codebook component type, codebook component number Nc, bandwidth indication, or frequency domain unit.

In particular, channel base vectors can be employed to create channels and generate precoding matrices of antennas. The channel base vector number can be the number of channel base vectors. The maximum number of ports can be the maximum number of communication antennas or the maximum number of communication ports that a terminal device has. The channel type indicator can be information that is indicative of the type of channel. The channel type indicator can include indications for communication scenarios such as city macro cellular, city microcellular, indoor, factory, square, rural, subway, etc. The codebook component type can be information that is indicative of the type of encoding codebook. The codebook component type can include parallel codebook components and serial codebook components. The codebook component number can be the number of the encoding codebooks. The bandwidth indication can be the information that is indicative of the bandwidth of the communication. In particular, the bandwidth can include the number of sub-bands, the number of physical resource blocks, and the value of the bandwidth. The frequency domain unit can be a basic unit in the frequency domain. In particular, the frequency domain unit can include sub-carriers, physical resource blocks, and sub-bands, and can be information that is indicative of the granularity of the channel in the frequency domain.

In an embodiment of the present disclosure, the terminal device can receive a parameter of the CSI configured by the base station. The parameter can be employed to generate the first channel state information reflecting the channel quality. The parameter of the channel state information includes at least one of, the channel base vectors, the number of channel base vectors, the maximum number of ports, channel type indicator, codebook component type, codebook component number, bandwidth indication, or frequency domain unit.

FIG. 4 depicts a flowchart showing a method for transmitting information of a set of network parameters according to an embodiment of the present disclosure, which can be applied to improve wireless communication quality. The method can be performed by an apparatus for transmitting a set of network parameters in an embodiment of the present disclosure. The apparatus can be implemented as software and/or hardware and can be typically integrated into a base station. Referring to FIG. 4, the method includes the following operations.

At operation 410, information of the set of network parameters is received.

The base station can receive the information of the set of network parameters sent by the terminal device, which information can be determined by the terminal device according to the channel features.

At operation 420, at least one set of neural network parameters is selected according to the information of the set of network parameters.

In an embodiment of the present disclosure, the base station may be preset with one or more sets of neural network parameters. The values of parameters in different sets of neural network parameters may be different. In some embodiments, the types of parameters in different sets of neural network parameters may also be different. When the set of network parameters is acquired, a selection can be made from the preset sets of neural network parameters according to the information of the set of network parameters. The number of selected sets of parameters can be any number greater than or equal to 1 within a reasonable range. The neural network model constructed by the set of network parameters can be a model for decompressing the second channel state information. And the set of neural network parameters employed in the base station can correspond to the set of neural network parameters that contributes to the compression and generation of the second channel state information in the terminal device.

According to an embodiment of the present disclosure, the information of the set of network parameters is received. A set of neural network parameters corresponding to the information of the set of network parameters is selected. The parameters of the neural network model are updated through the transmission of the information of the set of network parameters. Thereby, the match with the current channel features is better. And the second channel state information is decompressed into the third channel state information according to the updated neural network, where the third channel state information can be the recovery/estimation of the first channel state information. Thereby improving the accuracy of channel state information determined by the base station and improving the quality of wireless communication.

In an embodiment, the set of neural network parameters includes the values of at least one of the following neural network parameters: compression ratio, activation function, number of network layers, network layer mapping, network layer weight, network layer offset, or network layer weight normalization coefficient.

FIG. 5 depicts a flowchart showing a method for transmitting information of a set of network parameters according to another embodiment of the present disclosure, which embodies the embodiment described above. Referring to FIG. 5, the method includes the following operations.

At operation 510, information of the set of network parameters transmitted according to the MAC CE is received, where the information of the set of network parameters includes at least one of, an identifier of the set of neural network parameters, feedback overhead of the channel state information, or a period for transmitting the channel state information reference signal.

The base station can update the neural network parameters upon receiving the information of the set of network parameters transmitted by the MAC CE.

At operation 520, at least one set of neural network parameters is selected according to the information of the set of network parameters.

In an example, the update of the identifier of the set of network parameters is triggered by the MAC CE, and at least one set of neural network parameters is selected according to the identifier of the set of neural network parameters.

At operation 530, the second channel state information is received, and the third channel state information is generated according to the second channel state information and the selected set of neural network parameters, where the third channel state information is an estimate of the first channel state information in the terminal device.

In particular, the channel state information includes information that reflects the channel quality. The second channel state information can be channel state information sent by a terminal device. The second channel state information can be generated by compressing the first channel state information in the terminal device by a neural network. The third channel state information can be an estimated value of the first channel state information. For example, in a base station, the second channel state information can be decompressed through a neural network to obtain the third channel state information.

In various embodiments of the present disclosure, the base station can receive the second channel state information sent by the terminal device and can employ the selected set of neural network parameters to compress and recover the second channel state information. The neural network model constructed according to the set of neural network parameters can be employed to decompress the channel state information. It can be understood that the third channel state information can be an estimated value of the first channel state information. The second channel state information with less communication overhead is transmitted, and the second channel state information can be recovered by the set of neural network parameters. Thereby, the transmission resource consumption for channel state information is reduced without compromising communication quality.

According to various embodiments of the present disclosure, by the received information of the set of network parameters transmitted according to the MAC CE, at least one set of neural network parameters is selected from the set of neural network parameters. The second channel state information is acquired. The third channel state information is determined according to the selected set of neural network parameters and the second channel state information. The channel state information is determined by means of the set of neural network parameters. Thereby, the accuracy of acquisition of the channel state information is improved and the communication quality of wireless communication is enhanced.

FIG. 6 depicts a flowchart showing a method for transmitting information of a set of network parameters according to another embodiment of the present disclosure, which embodies the embodiment described above. Referring to FIG. 6, the method includes the following operations.

At operation 610, information of the set of network parameters transmitted according to a dedicated PUCCH is received, where the information of the set of network parameters includes at least one of, an identifier of the set of neural network parameters, feedback overhead of the channel state information, or a period for transmitting the channel state information reference signal.

At operation 620, at least one set of neural network parameters is selected according to the identifier of the set of neural network parameters.

The terminal device can update the identifier of the set of neural network parameters when receiving the scheduling request of the dedicated PUCCH. For example, the identifier of the set of neural network parameters A can be changed to the identifier of the set of neural network parameters B. And one or more sets of neural network parameters can be selected according to the updated identifier of the set of neural network parameters.

At operation 630, the second channel state information is received, and the third channel state information is generated according to the second channel state information and the selected set of neural network parameters, where the third channel state information is an estimate of the first channel state information in the terminal device.

According to various embodiments of the present disclosure, the set of neural network parameters is determined by the obtained identifier of the set of neural network parameters. The update of the identifier of the set of neural network parameters is triggered when the scheduling request according to the dedicated PUCCH is received. A set of neural network parameters is determined by the updated identifier of the set of neural network parameters. The third channel state information is generated based on the selected set of neural network parameters and the received second channel state information. Thereby, the accuracy of acquisition of the set of neural network parameters is improved and the communication quality of wireless communication is enhanced by employing the information of the set of the network parameters.

In an embodiment, the information of the set of neural network parameters includes at least one of, an identifier of the set of neural network parameters, feedback overhead of the channel state information, or a period for transmitting the channel state information reference signal.

In an embodiment, the method further includes configuring a parameter of the CSI which is employed to determine the first channel state information by the terminal device. The parameter of the channel state information includes at least one of, the channel base vectors, the number of channel base vectors, the maximum number of ports, channel type indicator, codebook component type, the number of codebook components Nc, bandwidth indication, or frequency domain unit.

In an embodiment of the present disclosure, the base station can also configure the parameter of the CSI in the terminal device. The parameter of the CSI can enable the terminal device to determine the first channel state information. The parameter of the CSI configured by the base station can include one or more of, channel base vectors, the number of channel base vectors, the maximum number of ports, channel type indicator, codebook component type, the number of the codebook component Nc, bandwidth indication, or frequency domain unit.

In an embodiment, the method further includes configuring channel state information reference signal parameters according to the received information of the set of network parameters.

In particular, the configured channel state information reference signal parameters may include a period of the channel state information reference signal.

In an embodiment of the present disclosure, the identifier of the set of network parameters can also be employed to configure the channel state information reference signal parameters, and the corresponding channel state information reference signal parameters of different identifiers of the set of network parameters can have different numbers and types.

In an embodiment, the method further includes, receiving a channel sounding reference signal (SRS), acquiring an uplink channel according to the SRS; and determining, according to the acquired uplink channel, at least one of, the uplink channel classification, a method for transmitting a channel state information reference signal, or feedback content.

In an embodiment of the present disclosure, the base station may also receive a channel SRS, acquire an uplink channel according to the SRS, and determine at least one of, the uplink channel classifications of the acquired uplink channel, the method for transmitting the channel state information reference signal, or the feedback content.

In an embodiment, the method further includes obtaining channel state information according to the uplink channel obtained by the SRS and the feedback content of the terminal device.

In an embodiment, the channel state information may include a first codebook and/or a second codebook. The first codebook is a codebook that is not subjected to compression by AI, and corresponds to the first channel state information. The second codebook is a codebook that is subjected to compression by AI, and corresponds to the second channel state information. In a terminal device, the second codebook may be determined by the first codebook. And in a base station, the first codebook may be estimated by the second codebook. The process is as follows.

The first codebook can output the second codebook through a neural network which can be a AutoEncoder. At the terminal device, this process can be an encoder in the AutoEncoder. The encoder includes K network layers, in which the i-th layer includes $L_{e,i}$ nodes, and includes at least one network layer weight $W_{e,i}$, 0-1 network layer offsets $b_{e,i}$, activation functions $S_{e,i}$, where i=1, . . . , Ke. The i-th layer can be a convolution layer, a fully connected layer or a pooling layer. They all belong to the network parameters of this encoder. On the base station side, a decoder corresponding to this encoder is provided. The decoder includes L layers, in which the i-th layer includes Lo nodes, at least one network layer weight $W_{d,i}$, 0-1 network layer offsets $b_{d,i}$, and activation functions $S_{d,i}$, where i=1, . . . , Kd. The i-th layer can be a convolution layer, a fully connected layer, a pooling layer, or a residual network block composed of several convolution layers. The terminal device inputs the first codebook into the encoder, and the encoder outputs the second codebook. And the terminal device transmits the second codebook to the base station. In some embodiments, the second codebook can also be quantized, encoded and modulated and then transmitted to the base station. The base station receives the second codebook. In some embodiments, the second codebook can also be dequantized, demodulated and decoded as the input of the decoder, and the decoder outputs the first codebook. And the channel state information W is obtained by restoring according to the first transformation basis corresponding to the first codebook.

In an embodiment, the number of elements corresponding to the first codebook and the second codebook is different, and the second codebook typically contains fewer elements than the first codebook. The ratio of the number of elements in the second codebook to the number of elements in the first codebook is called the compression ratio. For example, the first codebook includes 2048 elements in total, and the second codebook has only 32 elements, then the compression ratio is 32/2048=1/64, and the compression ratio is 1/64.

The set of neural network parameters received by the terminal device and the set of the neural network parameters of the base station can be determined by the method described below.

FIG. 7 depicts an example diagram showing the transmission of the channel state information according to an embodiment of the present disclosure. Referring to FIG. 7, a AutoEncoder is provided in order to obtain a second codebook from the first codebook and obtain the first codebook from the second codebook at the base station side. The AutoEncoder includes an encoder and a decoder. The network parameters of the AutoEncoder can be obtained through offline training, or the process of offline training combined with online training. The base station can configure the network parameters of M encoders through high-layer signaling, and transmit the network parameters of M AutoEncoders to the terminal device through high-layer signaling and/or physical layer signaling. The terminal device selects one encoder according to at least one factor of a channel scene, channel angle extension and angle extension, and transmits the selected encoder to the base station through the physical layer and/or high-layer signaling. And the terminal device encodes the first codebook with the selected encoder to obtain the second codebook. The base station obtains the corresponding decoder through the encoder index fed back by the terminal device, and processes the received second codebook to obtain the first codebook. It should be noted that if M=1, it is not necessary for the terminal device to feed back the encoder index. The encoder index here corresponds to the identifier of the set of network parameters in the information of the network parameters.

In an embodiment, the selection of the set of neural network parameters by the terminal device can be implemented with the following operations.

At operation 1, N sets of AI parameters corresponding to N different channel scenarios are configured respectively.

Channel scenarios here include but are not limited to, indoor, factory, subway, city macro cellular, city microcellular, office and other wireless communication scenarios.

At operation 2, the terminal device receives the CSI RS sent by the base station, and tests the coding and decoding of N sets of AI parameters for the CSI measured by the CSI RS, and the terminal device feeds back the information of the suggested set of AI parameters to the base station, which may take into account the identifier, the size of CSI feedback overhead (compression ratio, quantization level, etc.), and the suggested period for transmitting the CSI RS.

At operation 3, the base station receives the information of the set of AI parameters fed back by the terminal device, and determines the set of AI parameters to be employed by the terminal device in conjunction with other information of the network. The base station may be required to send configuration information for the set of AI parameters to the terminal device within a given time range.

In an embodiment, the selection of the set of neural network parameters by the base station can be implemented with the following operations.

The terminal device sends pilot parameters such as SRS to the base station. The base station preprocesses the pilot parameters according to the received SRS to obtain the time domain channel, and selects a set of AI parameters from N parameters for coding and decoding test, according to the channel features.

Through the high-level parameters, the coding and decoding tests of the selected set of AI parameters are transmitted to the terminal device. It can be conceived that, the information of suggested set of AI parameters by the base station may include the identifier, the size of CSI feedback overhead (compression ratio, quantization level, etc.), and suggested period for transmitting the CSI RS.

In an embodiment, the terminal device can switch the identifier of the set of network parameters through the following operations.

The terminal device processes CSI according to the suggested set of neural network parameters by the base station. But with the change of the wireless channel environment, the currently employed set of neural network parameters may mismatch with the up-to-date wireless channel environment. Therefore, the terminal device can inform the base station of the encountering problems or even the suggested set of neural network parameters in the CSI feedback information through a specific bit sequence (or the value of the bit set in a specific position).

a) If the CSI is carried in PUSCH, then the PUSCH can be triggered to carry the MAC CE to inform the base station of the identifier of the new set of neural network parameters. Before the base station determines to employ the updated network parameters, the current CSI can be fed back by the traditional codebook.

b) The terminal device can send a dedicated SR to the base station through PUCCH. The SR will inform the base station that the configuration information of the currently employed neural network parameter mismatches with the practical channel situation and shall be adjusted. After receiving the SR, the base station quickly allocates resources for the terminal device to send the PUSCH carrying the configuration information of the suggested set of neural network parameters. In addition, the procedure that the configuration information of the new set of neural network parameters takes effect, can be the period from the time when the terminal device sends SR to the time when the new set of neural network parameters takes effect, or the period when the new set of AI parameters takes effect after the terminal device sends PUSCH. If the terminal device needs to feed back the CSI information, fall back the codebook feedback mode can be made in such a case.

c) If the terminal device fails to find a set of neural network parameters that can match the current wireless channel, the terminal device needs to carry information that requires the base station to employ the traditional codebook for feedback with the terminal device in the future.

In an embodiment, the base station and/or the terminal device can update the set of neural network parameters in the following ways.

If the terminal device fails to find any set of AI parameters that matches the current wireless channel environment from the existing N sets of neural network parameters, then the base station needs to find a new set of neural network parameters based on the big data training of the wireless channel, and send the set of neural network parameters to the terminal device, or return to the traditional codebook feedback mode.

Case a), full-parameter adjustment: in such a case, it is critical to provide a special terminal device nearby, which has strong processing capacity and no power consumption limitation. The nearby terminal device informs the special terminal device of the measurement information, and the special terminal device cooperates with the base station to complete the training of the set of neural network parameters.

Case b), partial-parameter adjustment (both for the base station and the terminal device): the base station adjusts some parameters in the existing set of neural network parameters such that the adjusted parameters can match with the existing wireless channel, and informs the terminal device of the information regarding the parameter modification.

Case c), partial-parameter adjustment (just for the base station, and not for the terminal device): the terminal device continues to employ the existing set of neural network parameters, and the base station adjusts its own set of neural network parameters. In such a case, it is important for the base station to inform the terminal device of the base station's adjusted set of neural network parameters, which facilitates the terminal device to select the set of neural network parameters later.

In an embodiment, the base station can also determine the CSI classification according to the uplink channel, and determine the content of channel state information feedback in the terminal device according to the CSI classification. The process is as follows.

At operation 1, the terminal device sends the SRS to the base station. The base station obtains the uplink channel based on the SRS, classifies the uplink channel through the AI algorithm, and determines the transmission method for the base station to send the CSI RS to the terminal device and the required content that is to be fed back by the terminal device.

In particular, the method for transmission of the CSI-RS includes the transmission period, the mapping relationship or binding relationship between the set of CSI-RS parameters and the set of neural network parameters. The content fed back by the terminal device is indicative of, for example, the traditional codebook or the AI-based codebook employed for feedback. If the AI-based codebook is employed for feedback, then the phase of the channel, the amplitude of the channel, the positions corresponding to L time-domain or frequency-domain channel impulse responses, L impulse response values with the largest amplitude, etc. can be further fed back, where L is a positive integer.

At operation 2, the base station sends the CSI-RS to the terminal device. The terminal device feeds back CSI after channel measurement based on the CSI-RS.

At operation 3, the base station obtains the downlink channel through AI technology based on the CSI and uplink channel.

FIG. 8 depicts a schematic diagram showing an apparatus for transmitting information of a set of network parameters according to an embodiment of the present disclosure, which can perform the method for transmitting information of a set of network parameters according to an embodiment of the present disclosure, which has corresponding functional modules and beneficial effects corresponding to the method. The apparatus can be implemented as software and/or hardware, and includes a neural network parameter module 701, a parameter set selection module 702, and a network information transmission module 703.

The neural network parameter module 701 is configured to acquire at least one set of neural network parameters.

The parameter set selection module 702 is configured to select at least one set of neural network parameters according to a channel feature.

The network information transmission module 703 is configured to transmit the information of the set of network parameters corresponding to the selected set of neural network parameters.

According to various embodiments of the present disclosure, by acquiring at least one set of neural network parameters with the neural network parameter module, selecting the set of neural network parameters according to the channel features with the parameter set selection module, and transmitting the information of the set of network parameters corresponding to the selected set of neural network parameters with network information transmission module, the neural network parameters are more in line with the current channel features, so that the neural network established with the new neural network parameters can be further utilized to generate channel state information. Thereby, the communication channel quality can be improved, and the communication resource consumption for the transmission of the channel state information can be reduced.

In an embodiment, the set of neural network parameters in the apparatus includes the values of at least one of the following neural network parameters: compression ratio, activation function, number of network layers, network layer mapping, network layer weight, network layer offset, or network layer weight normalization coefficient.

In an embodiment, the information of the set of network parameters in the apparatus includes at least one of, an identifier of the set of neural network parameters, feedback overhead of the channel state information, or a period for transmitting the channel state information reference signal.

In an embodiment, the apparatus further includes, a channel state information module, which is configured to generate second channel state information according to the selected set of neural network parameters and the first channel state information.

In an embodiment, the apparatus further includes, a channel state parameter module, which is configured to acquire the parameters of the channel state information which is configured to determine the first channel state information. The parameters of the channel state information include at least one of, channel base vectors, number of channel base vectors, maximum number of ports, channel type indicator, codebook component type, the number of codebook components Nc, bandwidth indication, or frequency domain unit.

In an embodiment, the apparatus further includes, an information transmission module, which is configured to transmit the information of the set of network parameters according to at least one of, a media access control control element (MAC CE), or the scheduling request of a dedicated physical uplink control channel (PUCCH).

In an embodiment, the apparatus further includes, a codebook generation module, which is configured to obtain a traditional codebook according to channel features and feedback the traditional codebook before determining to employ the selected set of neural network parameters.

In an embodiment, the apparatus further includes, a parameter updating module, which is configured to acquire and feedback the updated neural network parameters.

FIG. 9 depicts a schematic diagram showing an apparatus for transmitting information of a set of network parameters according to an embodiment of the present disclosure, which can perform the method for transmitting information of a set of network parameters according to an embodiment of the present disclosure, which has corresponding functional modules and beneficial effects corresponding to the method. The device can be implemented as software and/or hardware, and includes a network information receiving module 801 and a network set selection module 802.

The network information receiving module 801 is configured to receive information of a set of network parameters.

The network set selection module 802 is configured to select at least one set of neural network parameters according to the information of the set of network parameters.

According to an embodiment of the present disclosure, the information of the set of network parameters is received by the network information receiving module. A set of neural network parameters corresponding to the information of the set of network parameters is selected by the network set selection module. The parameters of the neural network model are updated through the transmission of the information of the set of network parameters. Thereby, the match with the current channel features is better. And the second channel state information is decompressed into the third channel state information according to the updated neural network, where the third channel state information can be the recovery/estimation of the first channel state information. Thereby improving the accuracy of channel state information determined by the base station and improving the quality of wireless communication.

In an embodiment, the apparatus further includes, a channel state information module, which is configured to receive the second channel state information, and generate the third channel state information according to the second channel state information and the selected set of neural network parameters, where the third channel state information is an estimate of the first channel state information.

In an embodiment, the apparatus further includes a parameter configuration module which is configured to configure at least one set of neural network parameters.

In an embodiment, the set of neural network parameters in the apparatus includes the values of at least one of the following neural network parameters: compression ratio, activation function, number of network layers, network layer mapping, network layer weight, network layer offset, or a network layer weight normalization coefficient.

In an embodiment, the information of the set of network parameters in the apparatus includes at least one of, an identifier of the set of neural network parameters, feedback overhead of the channel state information, or a period for transmitting the channel state information reference signal.

In an embodiment, the apparatus further includes, a channel parameter configuration module, which is configured to configure a parameter of the CSI, where the parameter of the CSI is employed to determine first channel state information by the terminal device, and the parameter of the CSI includes at least one of, channel base vectors, number of channel base vectors, maximum number of ports, channel type indicator, codebook component type, codebook component number Nc, bandwidth indication, or frequency domain unit.

In one embodiment, the channel state information in the apparatus includes first channel state information and/or second channel state information, where the first channel state information is an AI-based codebook and the second channel state information is a traditional codebook.

In an embodiment, the apparatus further includes, an information receiving module, which is configured to receive information of the set of network parameters transmitted according to at least one of, a media access control control element (MAC CE), or a dedicated physical uplink control channel (PUCCH).

In an embodiment, the apparatus further includes, a reference channel parameter configuration module, which is configured to configure channel state information reference signal parameters according to the received information of the set of network parameters.

In an embodiment, the apparatus further includes, an uplink channel module which is configured to receive a channel sounding reference signal (SRS), acquire an uplink channel according to the SRS; and determine, according to the acquired uplink channel, at least one of, uplink channel classification, a method for transmitting a channel state information reference signal, or feedback content.

In an embodiment, the uplink channel module further includes, a state information unit, configured to acquire channel state information according to the uplink channel obtained by the SRS and the feedback content of the terminal device.

Figure 10:
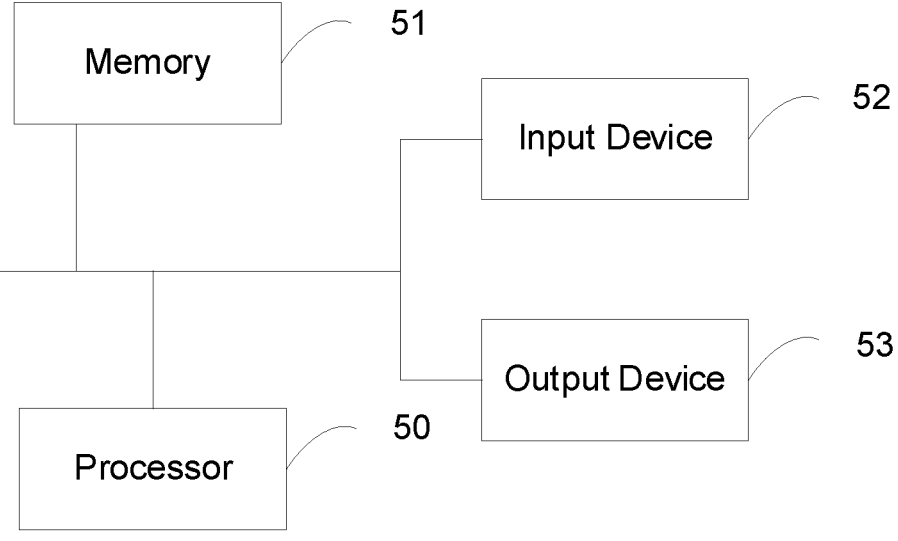
FIG. 10 depicts a schematic diagram showing a terminal device according to an embodiment of the present disclosure.

FIG. 10 depicts a schematic diagram showing a terminal device according to an embodiment of the present disclosure. As shown in FIG. 10, the terminal device includes a processor 50, a memory 51, an input device 52, and an output device 53. Although one processor 50 is shown by way of an example in FIG. 7, more processors 50 can be provided in the terminal device. The processor 50, the memory 51, the input device 52, and the output device 53 in the terminal device can be connected by a bus or other means. FIG. 10 shows the connection implemented as a bus by way of an example.

As a computer-readable storage medium, the memory 51 can be configured to store software programs, computer-executable programs and modules, such as modules corresponding to the apparatus for transmitting information of a set of network parameters in an embodiment of the present disclosure (i.e., neural network parameter module 701, parameter set selection module 702, and network information transmission module 703). The software programs, instructions and modules stored in the memory 51, when executed by the processor 50, causes the processor 50 to perform various functional applications and data processing of the terminal device, to carry out any one of the above-mentioned methods for transmitting information of a set of network parameters.

The memory 51 may generally include a program storage section and a data storage section, in which the program storage section may store an operating system and application programs for performing at least one operation, and data storage section may store data created according to the operation of the terminal device, or the like. In addition, the memory 51 can include a high-speed random-access memory and a nonvolatile memory, such as at least one disk memory device, a flash memory device, or other nonvolatile solid-state memory devices. In some implementations, the memory 51 may further include memory remotely arranged with respect to the processor 50, and the remote memory may be connected to the terminal device through a network. Examples of the above networks include, but are not limited to, the Internet, intranet, local area network, mobile communication network, and combinations thereof.

The input device 52 may be configured to receive input numeric or character information and generate key signal input related to user settings and function control of the terminal device. The output device 53 may include a display device such as a screen.

Figure 11:
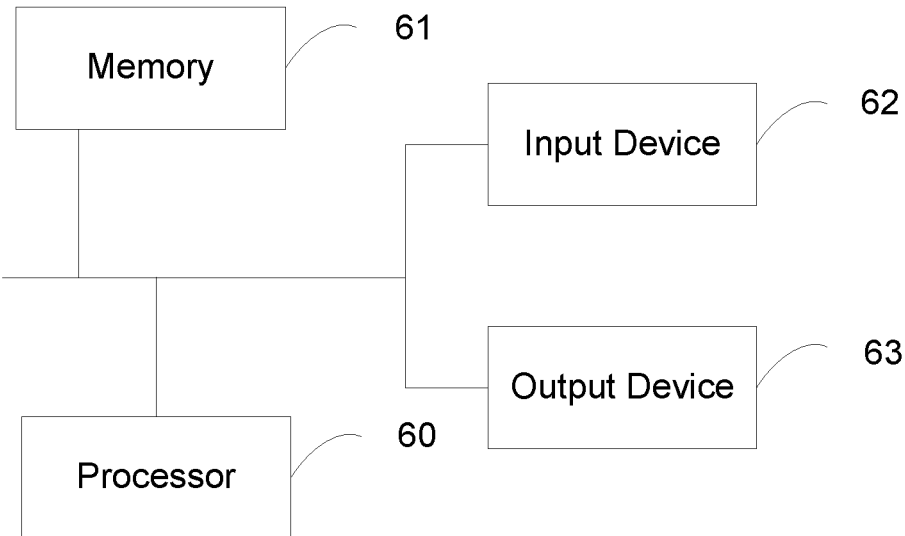
FIG. 11 depicts a schematic diagram showing a base station according to an embodiment of the present disclosure.

FIG. 11 depicts a schematic diagram showing a base station according to an embodiment of the present disclosure. As shown in FIG. 11, the base station includes a processor 60, a memory 61, an input device 62, and an output device 63. Although one processor 60 is shown by way of an example in FIG. 7, more processors 60 can be provided in the base station. The processor 60, the memory

61, the input device 62, and the output device 63 in the base station can be connected by a bus or other means. FIG. 11 shows the connection implemented as a bus by way of an example.

As a computer-readable storage medium, the memory 61 can be configured to store software programs, computer-executable programs and modules, such as modules corresponding to the apparatus for transmitting information of a set of network parameters in an embodiment of the present disclosure (i.e., network information receiving module 801 and network set selection module 802). The software programs, instructions and modules stored in the memory 61, when executed by the processor 60, causes the processor 60 to perform various functional applications and data processing of the base station, to carry out any one of the above-mentioned methods for transmitting information of a set of network parameters.

The memory 61 may generally include a program storage section and a data storage section, in which the program storage section may store an operating system and application programs for performing at least one operation, and data storage section may store data created according to the operation of base station, or the like. In addition, the memory 61 can include a high-speed random-access memory and a nonvolatile memory, such as at least one disk memory device, a flash memory device, or other nonvolatile solid-state memory devices. In some implementations, the memory 61 may further include memory remotely arranged with respect to the processor 60, and the remote memory may be connected to the base station through a network. Examples of the above networks include, but are not limited to, the Internet, intranet, local area network, mobile communication network, and combinations thereof.

The input device 62 may be configured to receive input numeric or character information and generate key signal input related to user settings and function control of the base station. The output device 63 may include a display device such as a screen.

An embodiment of the present disclosure further provides a storage medium containing computer-executable instructions, which, when executed by a computer processor, causes the processor to carry out a method for transmitting information of a set of network parameters, the method includes, acquiring at least one set of neural network parameters; selecting at least one set of the neural network parameters according to a channel feature; and transmitting information of the set of network parameters corresponding to the selected set of neural network parameters.

Alternatively, the method includes, receiving information of a set of network parameters; selecting at least one set of the neural network parameters according to the information of the set of network parameters.

It is apparent that the storage medium according to the present disclosure contains computer-executable instructions which are not limited to operations of the above-mentioned methods, and may also be executable to perform related operations in the method according to any one of the embodiments of the present disclosure.

According to various embodiments of the present disclosure, at least one set of neural network parameters is acquired, a set of neural network parameters is selected according to the channel features, and the information of the set of network parameters corresponding to the selected set of neural network parameters is transmitted. The set of neural network parameters is selected according to the channel features, and the information of the set of network parameters corresponding to the set of neural network parameters is determined and transmitted. Thereby, the utilization of the neural network in wireless communication is achieved, thus improving the adaptability of the neural network to the channel features, reducing the resource consumption of channel state information transmission, and enhancing the communication quality of wireless communication.

From the description of the above embodiments, it is apparent to a person having ordinary skills in the art that the method of the above embodiments can be implemented by means of software with necessary general hardware, or by hardware, of course, but in many cases, the former is the better practice. Based on this understanding, the technical solution or the part that contributes to the prior art of the present disclosure can be embodied in the form of software products, which can be stored in a computer-readable storage medium such as floppy disk, Read-Only Memory (ROM), Random Access Memory (RAM), FLASH memory, hard disk or optical disk of a computer, etc., including several instructions to cause a computer device (which can be a personal computer, a server, or a network device, etc.) to carry out the methods described in various embodiments of the present disclosure.

It is worth noting that in the above embodiment of the apparatus, each unit and module included is only divided according to the functional logic, but it is not limited to the above division, as long as the corresponding functions can be realized. In addition, the specific names of the functional units are intended for distinguishing the units from each other, and are not intended to limit the scope of the present disclosure.

It shall be appreciated by a person having ordinary skills in the art that all or some of the steps in the methods, functional modules/units in systems and devices disclosed above can be implemented as software, firmware, hardware and their appropriate combinations.

In the hardware implementation, the division between functional modules/units mentioned in the above description does not necessarily correspond to the division of physical components. For example, a physical component may have multiple functions, or a function or step may be performed by several physical components in cooperation. Some or all physical components can be implemented as software executed by a processor, such as a central processing unit, a digital signal processor or a microprocessor, or as hardware, or as an integrated circuit, such as an application-specific integrated circuit. Such software can be distributed on computer-readable media, which can include computer storage media (or non-transitory media) and communication media (or transitory media). As is well known to a person having ordinary skills in the art, the term computer storage medium includes volatile and nonvolatile, removable and non-removable medium implemented in any method or technology for storing information such as computer-readable instructions, data structures, program modules or other data. Computer storage medium includes, but is not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to those having ordinary skills in the art that communication media usually contains computer-readable instructions, data structures, program modules or other data in modulated data signals such as carrier waves or other transmission mechanisms, and can include any information delivery media.

Some embodiments of the embodiments of the present disclosure are illustrated above in conjunction with the drawings, and the present disclosure is not limited thereto. Any modifications, equivalents, alternations, or improvements, made within the scope of the present disclosure shall be included in the scope of the present disclosure.

What is claimed is:

1. A method for transmitting information of a set of network parameters, comprising,
    acquiring at least one set of neural network parameters;
    selecting at least one set of neural network parameters from the at least one set of neural network parameters according to a channel feature;
    transmitting information of the set of network parameters corresponding to the selected set of neural network parameters; and
    generating second channel state information (CSI) according to the selected set of neural network parameters and first CSI.

2. The method as claimed in claim 1, wherein the set of neural network parameters comprises a value of at least one of,
    a compression ratio, an activation function, a number of network layers, a network layer mapping, a network layer weight, a network layer offset, or a network layer weight normalization coefficient.

3. The method as claimed in claim 1, wherein the information of the set of network parameters comprises an identifier of the set of neural network parameters, and at least one of,
    feedback overhead of channel state information (CSI), or
    a period for transmitting a channel state information reference signal (CSI-RS).

4. The method as claimed in claim 1, further comprising,
    transmitting the information of the set of network parameters according to at least one of, a media access control control element (MAC CE), or a dedicated physical uplink control channel (PUCCH).

5. The method as claimed in claim 1, further comprising,
    acquiring and feeding back updated neural network parameters.

6. A terminal device, comprising,
    at least one processor; and
    a memory configured to store at least one program which, when executed by the at least one processor, causes the at least one processor to carry out the method as claimed in claim 1.

7. A non-transitory computer-readable storage medium storing at least one computer program which, when executed by a processor, causes the processor to carry out the method as claimed in claim 1.

8. The method as claimed in claim 1, further comprising, acquiring a parameter of the CSI, wherein the parameter of the CSI is employed to determine the first CSI, and the parameter of the CSI comprises at least one of,
    channel base vectors, number of channel base vectors, maximum number of ports, channel type indicator, codebook component type, codebook component number Nc, bandwidth indicator, or frequency domain unit.

9. The method as claimed in claim 8, further comprising, acquiring a traditional codebook according to the channel feature and feeding back the traditional codebook before deciding to employ the selected set of neural network parameters.

10. A method for transmitting information of a set of network parameters, comprising, receiving information of a set of network parameters;

selecting at least one set of neural network parameters according to the information of the set of network parameters; and receiving second channel state information (CSI), wherein, the second CSI is generated according to a set of neural network parameters selected by a terminal device, and first CSI.

11. The method as claimed in claim 10, further comprising, generating third channel state information according to the second CSI and the selected set of neural network parameters.

12. The method as claimed in claim 10, further comprising, configuring at least one set of neural network parameters.

13. The method as claimed in claim 10, wherein the set of neural network parameters further comprises a value of at least one of, a compression ratio, an activation function, a number of network layers, a network layer mapping, a network layer weight, a network layer offset, or a network layer weight normalization coefficient.

14. The method as claimed in claim 10, wherein the information of the set of the network parameters comprises at least one of, an identifier of the set of neural network parameters, feedback overhead of the CSI, or a period for transmitting a channel state information reference signal (CSI-RS).

15. The method as claimed in claim 10, further comprising, receiving information of the set of network parameters transmitted according to at least one of, a media access control control element (MAC CE), or a dedicated physical uplink control channel (PUCCH).

16. The method as claimed in claim 10, further comprising, configuring a parameter of a channel state information reference signal (CSI-RS) according to the received information of the set of network parameters.

17. The method as claimed in claim 10, further comprising, receiving a channel sounding reference signal (SRS), and acquiring an uplink channel according to the SRS; and determining, according to the acquired uplink channel, at least one of, an uplink channel classification, a method for transmitting a channel state information reference signal (CSI-RS), or a feedback content.

18. The method as claimed in claim 17, further comprising, acquiring CSI according to the uplink channel obtained by the SRS and the feedback content of the terminal device.

19. A base station, comprising, at least one processor; and a memory configured to store at least one program which, when executed by the at least one processor, causes the at least one processor to carry out the method as claimed in claim 10.

* * * * *